H. VIEDT.
ICE CREAM FREEZER.
APPLICATION FILED JULY 27, 1907.
911,348.
Patented Feb. 2, 1909.
3 SHEETS—SHEET 1.
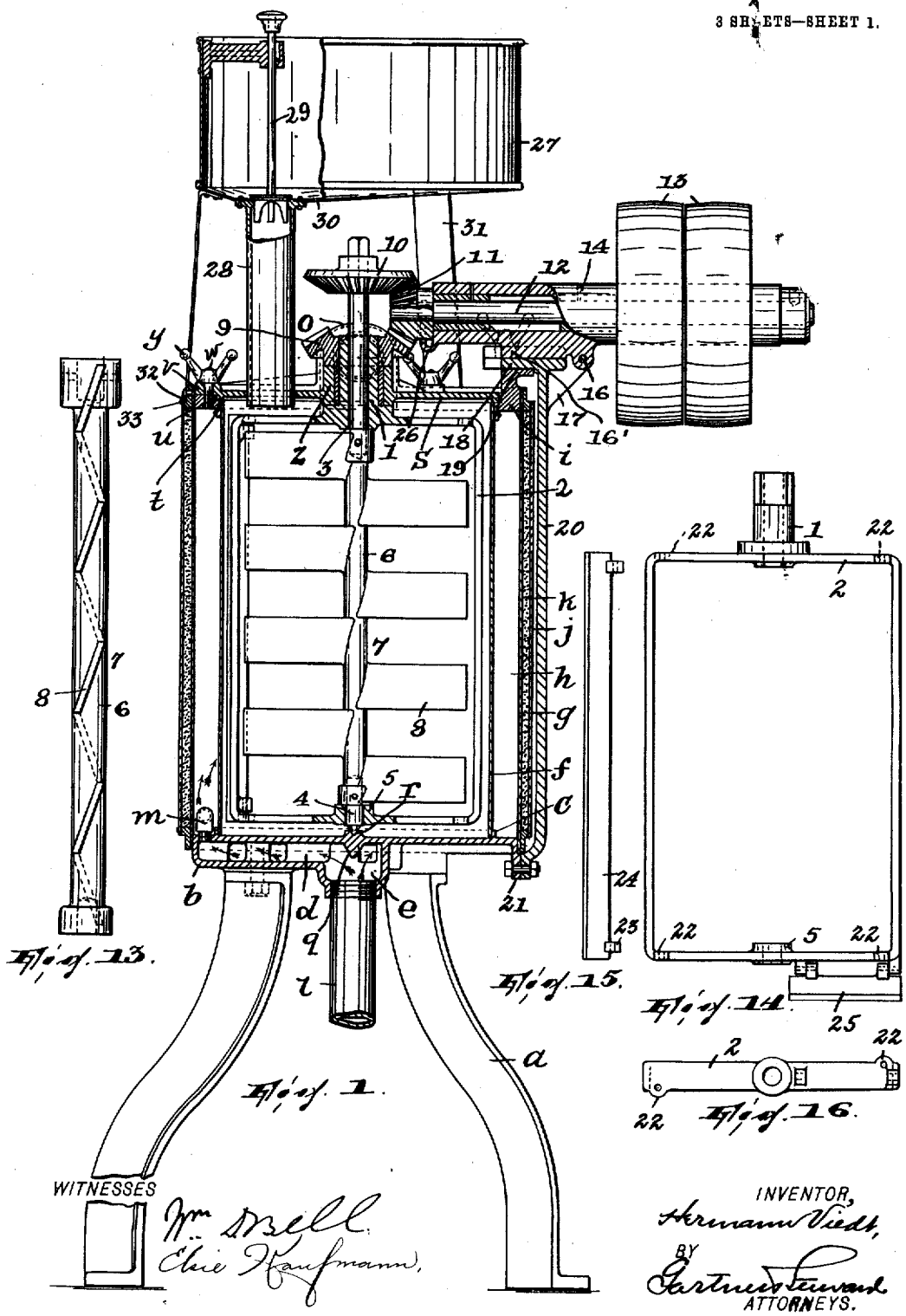

H. VIEDT.
ICE CREAM FREEZER.
APPLICATION FILED JULY 27, 1907.
911,348.
Patented Feb. 2, 1909.
3 SHEETS—SHEET 2.
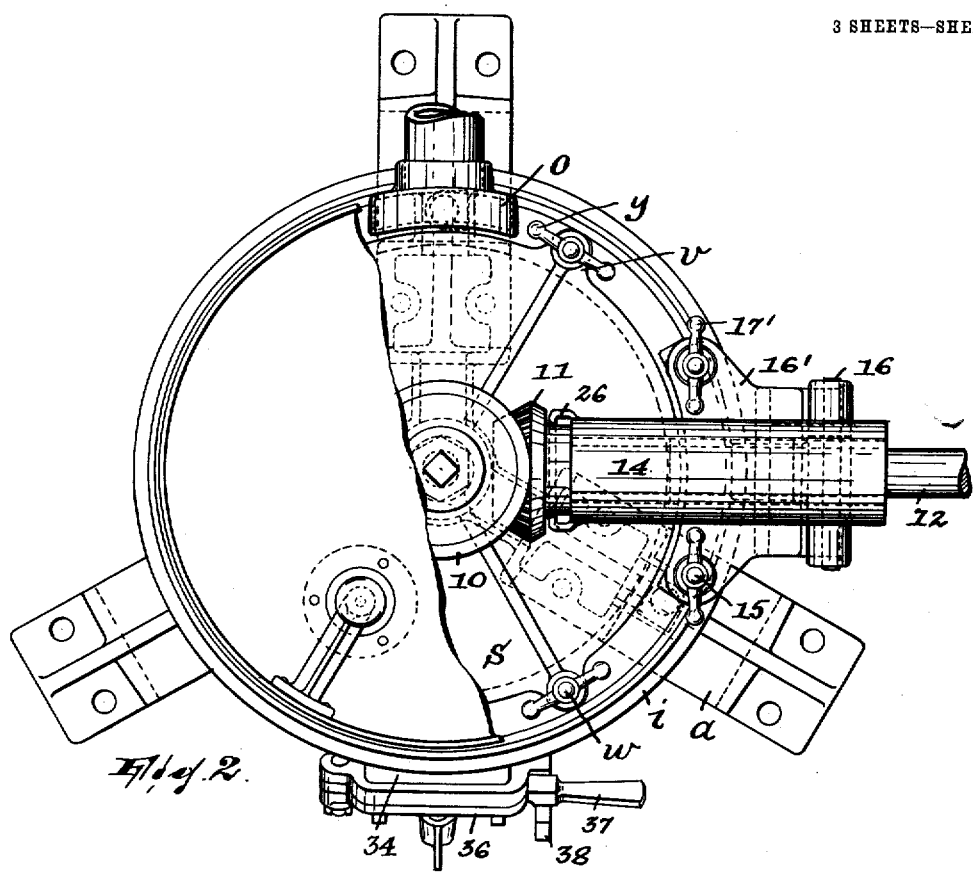
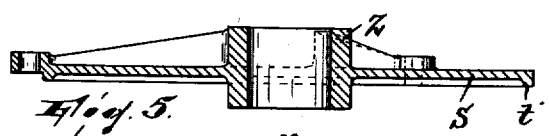
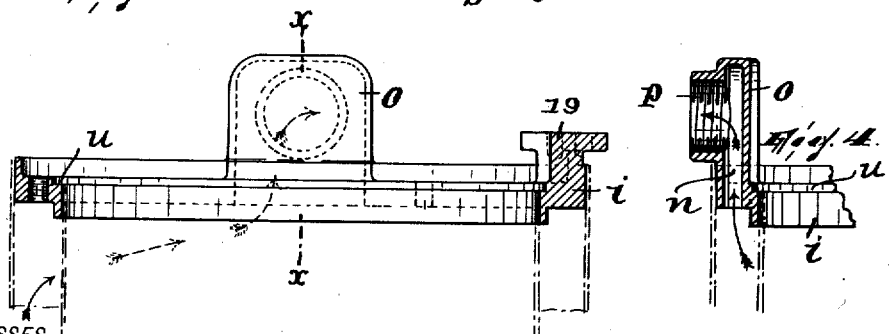
WITNESSES
INVENTOR,
Hermann Viedt,
BY
Gartner Leuward,
ATTORNEYS.

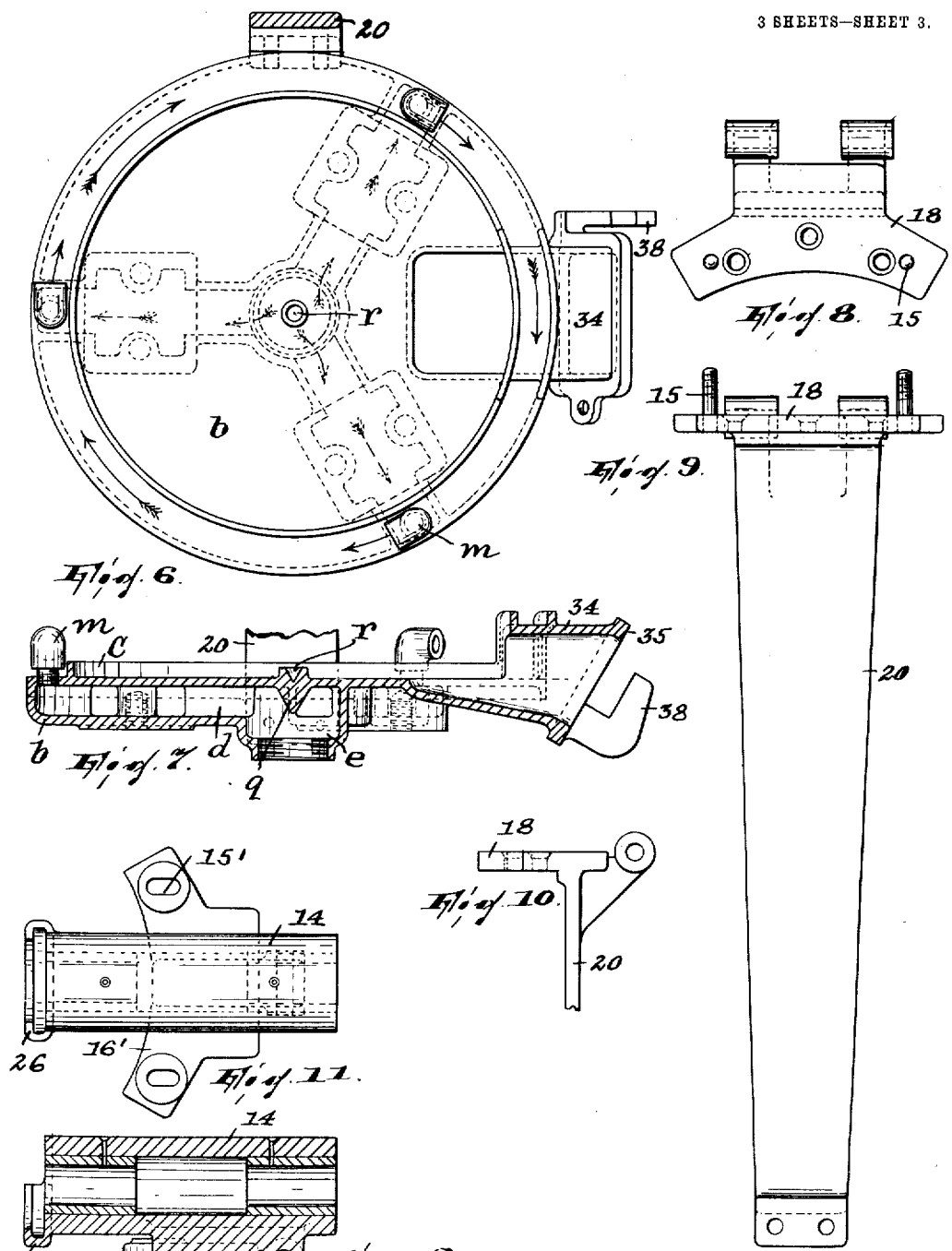

UNITED STATES PATENT OFFICE.

HERMANN VIEDT, OF MORRISTOWN, NEW JERSEY.

ICE-CREAM FREEZER.

No. 911,348.  Specification of Letters Patent.  Patented Feb. 2, 1909.

Application filed July 27, 1907. Serial No. 385,891.

*To all whom it may concern:*

Be it known that I, HERMANN VIEDT, a citizen of the United States, residing in Morristown, Morris county, New Jersey, have invented certain new and useful Improvements in Ice-Cream Freezers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My present invention consists in certain improvements in ice cream freezers which have been evolved in the practical use of the machines of the type illustrated in my U. S. application for patent for ice cream freezers, Serial No. 357,817, *i. e.*, wherein the liquid to be frozen is designed to leave the machine in the semi-solid condition, to be afterwards completely solidified in molds in separate apparatus.

Referring to the accompanying drawings, Figure 1 is a view in vertical section, showing certain parts in side elevation, of the improved machine; Fig. 2 is a top plan view, the supply hopper being partly broken away; Fig. 3 is a vertical sectional view of a ring which closes the top of the cylinder for the freezing liquid; Fig. 4 is a sectional view of what is shown in Fig. 3 on the line $x$—$x$ in said figure; Fig. 5 is a vertical sectional view of the cover for the freezing chamber; Fig. 6 is a top plan view of the base wall of the apparatus; Fig. 7 is a vertical sectional view of what is shown in Fig. 6 taken centrally of the cream discharge opening; Fig. 8 is a plan view of the fixed part of a support for the main drive shaft; Fig. 9 is an elevation; Fig. 10 is a side view thereof; Fig. 11 is a plan view of the pivoted part of said support; Fig. 12 is a longitudinal sectional view of what is shown in Fig. 11; Fig. 13 is a side view of the agitating means, and, Figs. 14, 15 and 16 are, respectively, a front view of a rectangular frame which embraces the agitating means, a front view of one of the scrapers carried by said frame and an underneath view of said frame.

The apparatus has three or more legs $a$ which are bolted to the bottom or base $b$, the same being preferably circular in plan. Referring to Figs. 1, 6 and 7, the part $b$ is a casting having an upwardly extending flange $c$ on its top surface and three or more radial ducts $d$ communicating at their inner ends with a tapped vertical bore $e$. Inside the flange $c$ takes the lower end of a cylinder $f$ which forms with a concentric outer cylinder $g$ an annular space $h$. The cylinders $f$ and $g$ are held together at the top by a ring $i$. The cylinders may be secured to the ring $i$ and base $b$ by any suitable means. The space $h$ serves to convey around the cylinder $f$, which forms the freezing chamber, the freezing liquid, and it may be insulated by a sheet zinc metal jacket $j$ and an interposed lining of corrugated asbestos or the like $k$, as shown in Fig. 1. Into the tapped bore $e$ may be screwed a pipe $l$ leading from a suitable refrigerating medium for the freezing liquid. The liquid flows from said pipe through the radial ducts $d$ and discharges from the latter into the space $h$ by means of the elbows $m$ which are tapped into the base $b$ and each of which communicates with one of the ducts $d$, as best shown in Figs. 1, 6 and 7. These elbows are constructed so that they discharge substantially horizontally and all in the same circular direction, with the result that the cooling liquid is caused to swirl around the cylinder $f$ spirally as it passes upwardly through the space $h$. The outlet for the freezing liquid from the space $h$ is afforded by the duct $n$ in an enlargement $o$ cast on the ring $i$, said enlargement having a tapped hole $p$ for the other end of the system of the piping which comprises pipe $l$ and the refrigerator. In the bore $e$, the base $b$ may be formed with a downwardly extending cone $q$ which, being in the axis of the bore, divides the stream entering through pipe $l$ and directs it into the ducts $d$; this cone may form a step bearing $r$ for a certain shaft to be described.

The cylinder $f$ is provided with a cover $s$ having a downwardly extending lip $t$ at its periphery which lip fits within a rabbet $u$ formed on the top of the ring $i$. The cover $s$ has radial lugs $v$ through which extend the threaded studs $w$ carried by the ring $i$, $y$ being wing-nuts which are screwed on the said studs after the cover is in place to hold the latter securely in position. The cover has a central hollow boss $z$ which affords a bearing for an integral sleeve 1 on the top of a rectangular frame 2 adapted to rotate in the freezing chamber. Said frame rotates on the spindles 3 and 4, the latter penetrating a boss 5 in the frame; these spindles are set in the ends of the circular shaft 6 of a beater or agitator 7 having the integral inclined blades 8. The lower spindle 4 has its lower end tapered and stepped in the bearing r. The upper end of the sleeve 1 is squared and receives the bevel pinion 9, whose bore is similarly formed so that the pinion will rotate the frame 2 when the pinion itself is rotated. The upper shaft of spindle 3 is likewise squared, and this carries the inverted bevel pinion 10. The bevel pinions 9 and 10 are connected by a third bevel pinion 11 which is secured on the main drive shaft 12 carrying the fast and loose pulleys 13; the shaft 12 is journaled in the bracket 14 which is pivoted at 16 on the bracket 17, the latter having a horizontal overhang 18 at the top which rests upon and is riveted to a saddle 19 integrally formed on the ring i and (part 17) also having a depending brace 20 which may be bolted at its lower end to a lug 21 depending from the base b. 15 are threaded studs which are carried by the overhang of bracket 17 and which are adapted to penetrate slots 15' in the base 16' of bracket 14, receiving the wing-nuts 17' which secure the bracket 14 down on the overhang.

The frame 2 is formed on opposite sides with the lugs 22 in which are pivoted lugs 23 on the scrapers 24 which wipe against the inside wall of the cylinder f; a similar scraper 25 may be pivoted on the lower portion of the frame to scrape the flat top surface of the base b.

The inner end of the bracket 14 is formed with a channeled lip 26 which acts to catch any of the lubricant.

27 is a hopper for the material to be frozen, 28 its discharge pipe, and 29 a valve controlling the escape of the material from said hopper; the bottom of the hopper may incline, as at 30, towards the pipe 28. The hopper is supported by three or more legs 31 secured to the ring 32 spacing the cylinder g and jacket j by screws 33. The discharge spout 34 for the frozen material is formed integrally with the base b, substantially the same as in my application aforesaid, said spout opening from the side as well as the bottom of the freezing chamber and having its mouth formed with a flat surface 35 around it; 36 is a valve pivoted at the mouth of the spout and having a handle 37 adapted to engage with a hook 38 on the spout, the inner face of the valve being flat so as to take squarely against the face 35 of the spout. The construction of the valve and its handle is substantially identical with the construction of the same parts as in my application referred to.

One important feature of my present invention is that involved in the means whereby the cooling liquid is first dispersed so as to enter the space h at several separated points and thereupon caused to take spiral courses in flowing upwardly through said space h around the freezing chamber; the improved arrangement referred to is one which fully and effectively accomplishes the object of exposing the cylindrical wall of the freezing chamber at all points to a cooling liquid flowing in contact therewith without duly encumbering the apparatus with devices, complicated in construction and expensive to install, for accomplishing this purpose.

Another important feature of my invention is that involved in the arrangement whereby access to the freezing chamber may, if necessary, be had without undue difficulty and inconvenience: The operator, in order to remove the cover s and thus have access to the freezing chamber, has only to slip the bevel pinion 10 upwardly off the spindle 3 and then, after removing the wing-nuts 17', turn the bracket 14 on its pivot 16, so that bevel pinion 11 will be raised out of the way, the cover being then free for removal after the bevel pinion 9 has been raised off the sleeve 1 and the wing-nuts y detached. The hopper is of course first removed by detaching the screws 33.

Having thus fully described my invention, what I claim as new and desire to secure by Letters Patent is:

1. The combination, with the receptacle for the freezing fluid and the receptacle for the material to be frozen arranged therein with a continuous space between them, of means for conducting a freezing fluid into said first-named receptacle adjacent one end of said space, said means comprising other means for directing the fluid into said space at substantially uniformly distanced points thereof, and transversely of a radius from the axis of said space, substantially as described.

2. The combination, with the receptacle for the freezing fluid, and the receptacle for the material to be frozen arranged therein with a continuous space between them, of means for conducting a circulating freezing fluid to and from said first-named receptacle connected with the latter adjacent the end portions of said space, said means comprising other means for directing the fluid into said space at substantially uniformly distanced points thereof, and transversely of a radius from the axis of said space, substantially as described.

3. The combination, with a base, of an inner cylinder, and an outer cylinder, said cylinders being arranged vertically on said base in spaced relation to each other, and said base comprising means for directing the freezing fluid into said space at substantially uniformly distanced points thereof, and transversely of a radius from the axis of said space, substantially as described.

4. The combination, with a base having radial ducts for the freezing fluid, of an inner cylinder and an outer cylinder, said cylinders being arranged vertically on said base in spaced relation to each other, and means for directing the discharge from said ducts into said space in a direction at an angle to the axis of said cylinder, substantially as described.

5. The combination, with a base having radial ducts for the freezing fluid, of an inner cylinder and an outer cylinder, said cylinders being arranged vertically on said base in spaced relation to each other, and said ducts being adapted to discharge into said space, and a ring surmounting said cylinders and closing off said space at the top and formed with an outlet for the freezing fluid from said space, substantially as described.

6. In an ice cream freezer, the combination of a suitable structure comprising a receptacle for the material to be frozen, a rotary device arranged in said receptacle, a cover for said receptacle penetrated by an axial portion of said device, a bracket resting on the top of said structure and having a rigid depending brace rigidly secured against a lower portion of said structure, another bracket pivoted in said first-named bracket, and power transmitting means operatively connected with said axial portion of said rotary device and having a part thereof journaled in said pivotal bracket, substantially as described.

7. In an ice cream freezer, the combination, with concentric cylinders forming the freezing chamber and a space for the freezing fluid, of a base supporting said cylinders and having an intake bore and radial ducts leading from said bore to the space between said cylinders, said base also having a cone arranged axially in said bore with its apex toward the mouth thereof, substantially as described.

8. In combination with spaced vertical inner and outer cylinders forming, respectively, the freezing chamber and a receptacle for the freezing fluid, means for introducing the freezing fluid to said receptacle and causing it to flow around the freezing chamber spirally comprising a nozzle discharging into the space between said cylinders transversely of a radius from the axis of the chamber for the freezing material, substantially as described.

In testimony, that I claim the foregoing, I have hereunto set my hand this 23rd day of July, 1907.

HERMANN VIEDT.

Witnesses:
JOHN W. STEWARD,
WM. D. BELL.